T. HYATT.

ILLUMINATING VAULT COVER OR GRATING.

No. 10,626. Reissued July 21, 1885.

Witness
T. C. Brecht
Thaddeus Hyatt

Inventor:
Thaddeus Hyatt

UNITED STATES PATENT OFFICE.

THADDEUS HYATT, OF NEW YORK, N. Y.

ILLUMINATING VAULT-COVER OR GRATING.

SPECIFICATION forming part of Reissued Letters Patent No. 10,626, dated July 21, 1885.

Original No. 257,714, dated May 9, 1882. Application for reissue filed September 29, 1884.

*To all whom it may concern:*

Be it known that I, THADDEUS HYATT, a citizen of the United States, and a resident of the city, county, and State of New York, have invented certain new and useful Improvements in Illuminating Vault-Covers or Gratings and Building-Constructions made therefrom, of which the following is a specification.

In the accompanying drawings, making part of this specification, like letters refer to like parts in all the figures.

Figure 1 represents a "concrete light" or grating made of artificial stone and set with glasses. A A show the stone or concrete grating; B B, the glasses; *a a*, gutters or water-courses formed in the concrete; *b b*, tie metals, or the metallic tensional strength of the concrete grating.

Figure 5:
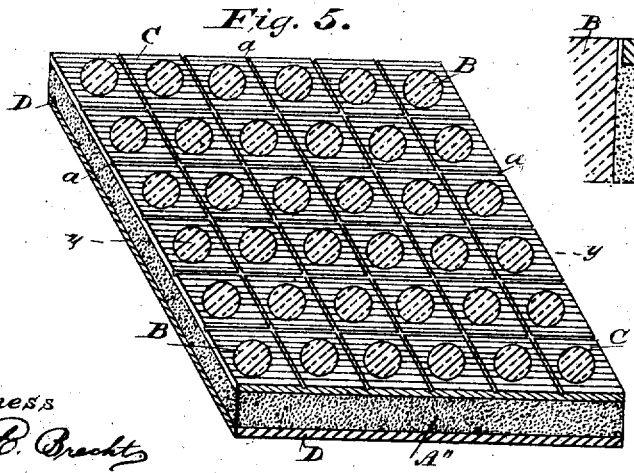

Fig. 5 represents a cast-iron grating covered with concrete, faced with soft metal, and set with glasses. D D show the cast-iron grating; A'' A'', the concrete; C C, the soft-metal surface-plate.

Figure 6:
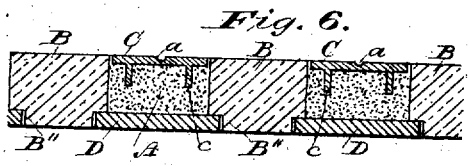

Fig. 6 is an enlarged cross-section of Fig. 5 on the line *y y*. B'' B'' show the shoulder and neck of the glasses where they enter the light-openings of the grating and are cemented fast.

Figure 7:
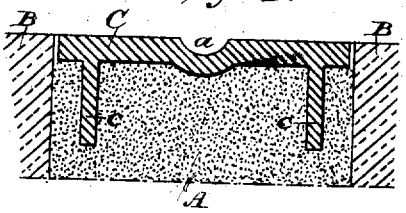

Fig. 7 is a full-size view of a portion of a lead plate.

The object of my invention with respect to the illuminating-gratings called "concrete lights," is to make them ornamental by means of a channeled surface, which at the same time aids to free the face of the glasses from dust and dirt.

The object of my invention, broadly, as to illuminating-gratings faced with soft metal, is to lessen the cost of making such lights, the purpose of the gutters made in the face of the soft metal being the same as with respect to gutters made in the face of the concrete grating.

Figure 2:
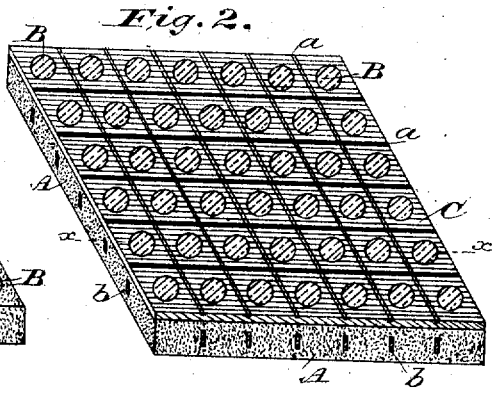
Fig. 2 represents the concrete light faced with a soft-metal plate. C C show the soft-metal plate.

Fig. 2 represents the cheapest mode of construction, and is the manufacture I prefer.

Figure 1:
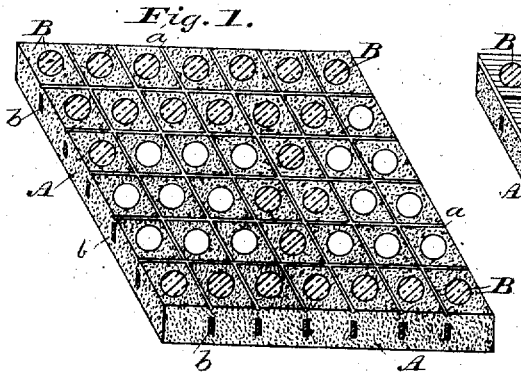

In making a concrete light such as Fig. 1 represents, I cast the concrete in a mold so formed as to leave the face of the concrete guttered, as shown, when the concrete is removed from the mold; and I prefer to cast the concrete grating in a mold formed with cores, to produce the openings or light-holes to be set with glasses after the concrete grating has become set and hard. The tie metals I place in the mold with the plastic concrete.

In making a concrete light faced with soft metal, as shown by Fig. 2, I place the metal plate face downward in the mold, and then put in the plastic concrete upon it, adding either tie metals or a cast-iron grating.

Figure 3:
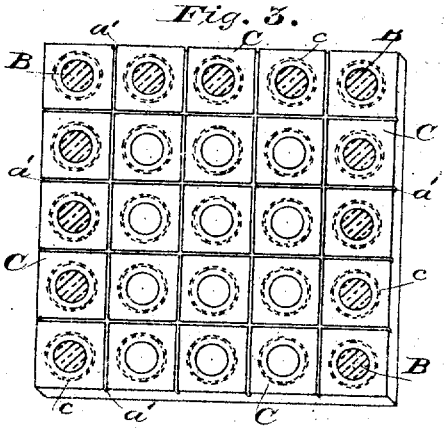
Fig. 3 represents the soft-metal plate C C before being attached to the concrete grating. *a' a'* show gutters or water-courses cast or formed in the surface of the plate; *c c*, attachment pieces or rings cast or formed upon the under face of the plate.
Figure 4:
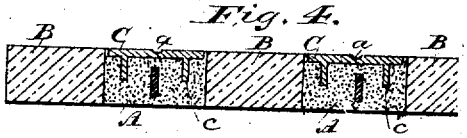
Fig. 4 represents an enlarged cross-section of Fig. 2 on the line *x x*.

The soft-metal facing-plate represented by Fig. 3 I prefer to make of lead, and I make the holdfasts *c c* preferably in the form of rings, as shown.

The mode of fastening a soft-metal foot-surface to illuminating-gratings by means of holdfasts upon the under face of the soft-metal plates, in combination with concrete, I find to be cheaper and more convenient than my former method of attachment, by means either of screws or "sweating," and to be equally efficacious.

In the drawings attached hereto I have represented my invention in the shape of illuminating-tiles, or that form of an illuminating-grating made to be used for constructing illuminating-roofs and roof-pavements; but I contemplate their use also in the shape of vault-covers for closing openings to vaults made in the footways of streets.

I desire to likewise explain that when I say, as on lines 41 to 44 of the first page of this specification, "the object of my invention with respect to the illuminating-gratings called 'concrete lights,' is to make them ornamental by means of a channeled surface," I do not wish to be understood as confining myself literally to a channeled surface. I have represented channels or gutters as the readiest and simplest form of my invention, but without intending to tie myself down to the channel method of carrying out my invention, which really consists in creating a depressed or sunk surface around the glasses for the purpose of putting an ornamental face upon the work, which may also at the same time (incidentally) aid to free the face of the glasses from dust and dirt. The channel form of making an ornamental sunk surface is but one of many ways in which I propose to carry out my invention. I propose, for example, in some cases to so sink the surface around the glasses as to give to the work the appearance as though each glass was set in a flat-faced mount of hexagonal, octagon, or other geometrical shape, made in some instances with curved bounding-lines at the corners or angles, where a group of any four glasses face each other. Other variations readily suggest themselves as a mode of applying the principle of my invention of a double or raised and sunk ornamental concrete surface and concrete light faced with on ornamental raised and sunk surface.

I desire, furthermore, to explain that Fig. 5 of the drawings, attached hereto, is intended to represent not only the combination of a cast-iron floor plate or grating covered with concrete when faced with soft metal, but it is meant to likewise represent the same combination when not faced with soft metal, but when instead thereof the face of the concrete itself is made ornamental by means of a raised and sunk surface, as aforesaid, and as illustrated by Fig. 1, where the concrete, in place of being combined with a cast-iron floor plate or grating, as represented by Fig. 5, is combined with "tie metals."

In place of "molding" I sometimes imprint the design upon the partially-set plastic face of the work by a suitable tool and pressure.

Having thus fully explained my invention, and indicated some of the many ways in which it may be applied, what I claim, and desire to secure by Letters Patent, is—

1. A concrete light or illuminating stone grating formed with a channeled foot-surface, substantially as and for the purposes herein set forth and illustrated.

2. A concrete light or illuminating stone grating formed with a soft-metal foot-surface, substantially as and for the purposes herein set forth and illustrated.

3. A cast-iron illuminating-grating combined with a soft-metal facing-plate and concrete, substantially as and for the purposes herein set forth and illustrated.

4. A soft-metal perforated facing-plate formed with holdfasts, and a channeled face in combination with an illuminating-grating, substantially as and for the purposes herein set forth and illustrated.

5. A stone light—that is to say, a concrete light—composed of tie metals, hydraulic cement or concrete, and glasses, when made with an ornamental foot-surface formed on the face thereof around and between the glasses by means of a double or raised and sunk design surface.

6. A concrete light—that is to say, an illuminating-grating—composed of a cast-iron floor plate or grating, hydraulic cement or concrete, and glasses, when made with an ornamental foot-surface formed on the face thereof around and between the glasses by means of a double or raised and sunk design surface.

7. An illuminating-grating made by combining tie metals and glasses with a plastic material capable of setting and hardening into stone or stone-like substance, when made with an ornamental foot-surface formed on the face thereof around and between the glasses by means of a double or raised and sunk design surface.

8. An illuminating-grating made by combining a cast-iron floor plate or grating and glasses with a plastic material capable of setting and hardening into stone or stone-like substance, when made with an ornamental foot-surface formed on the face thereof around and between the glasses by means of a double or raised and sunk design surface.

THADDEUS HYATT.

Witnesses:
CHAS. H. SHEPARD,
W. H. SHEPARD.